United States Patent
Plum

[11] 3,994,065
[45] Nov. 30, 1976

[54] FOAM RUBBER CUTTING DEVICE

[76] Inventor: Lyle G. Plum, 3807 E. Emile Zola, Phoenix, Ariz. 85032

[22] Filed: Feb. 26, 1976

[21] Appl. No.: 661,440

[52] U.S. Cl. .................................. 30/273; 30/355; 83/427
[51] Int. Cl.² ................... B23D 49/16; B27B 11/10
[58] Field of Search ............ 30/273, 275, 166, 392, 30/393, 394, 355; 83/427, 846, 847

[56] References Cited
UNITED STATES PATENTS

| | | | |
|---|---|---|---|
| 431,999 | 7/1890 | Salisbury | 30/273 |
| 1,911,974 | 5/1933 | Shelton | 30/355 X |
| 2,659,969 | 11/1953 | Merkur | 30/275 X |
| 2,799,930 | 7/1957 | Champlin | 30/355 |
| 3,153,363 | 10/1964 | Hoenke | 83/427 |

*Primary Examiner*—Al Lawrence Smith
*Assistant Examiner*—J. C. Peters
*Attorney, Agent, or Firm*—Cahill, Sutton & Thomas

[57] ABSTRACT

A reciprocating saw for cutting foam rubber having a blade with a pattern of no-set teeth interrupted at intervals by toothless arcuate grooves, and a guide member having a slotted, elongated, wedge-shaped section enclosing the portion of the blade rearward of the blade cutting section, and a base section connected to the slotted section for confining the material to be cut above the base and in the cutting region of the blade during the cutting operation.

11 Claims, 5 Drawing Figures

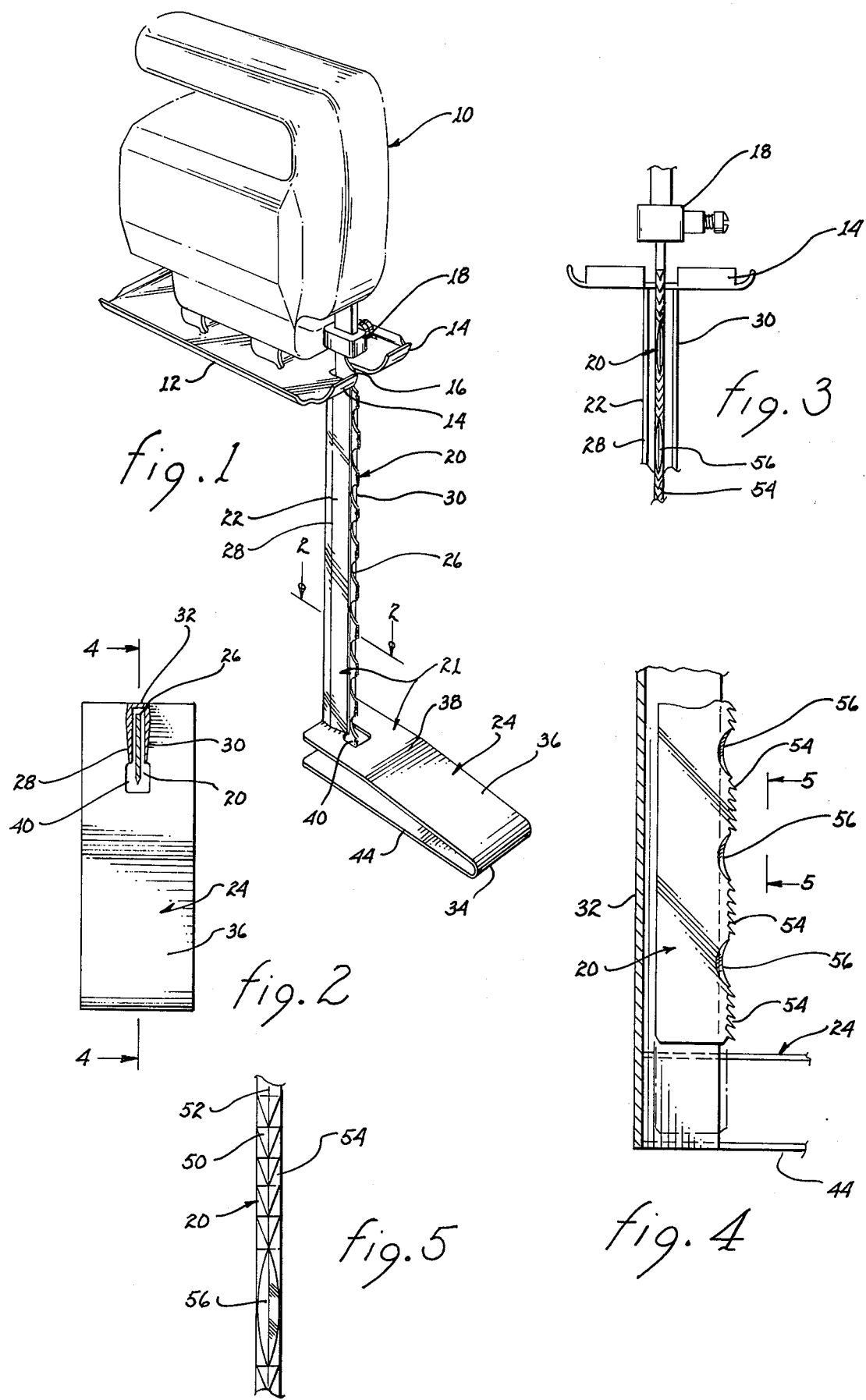

FOAM RUBBER CUTTING DEVICE

This invention relates to a cutting device, and more particularly, to a device and elements thereof for cutting material having the characteristics of foam rubber or polyfoam.

Cutting of foam rubber into various shapes and sizes is difficult to accomplish with even a modicum of exactness. Special saws and accessories have been designed to cut foam rubber. One such saw utilizes a double blade arrangement. Complicated gear reduction systems have also been utilized in an attempt to conquer the problems presented by cutting of polyfoam. Such specialized equipment is expensive. The smaller businesses utilizing special foam rubber shapes often purchase pre-cut rubber rather than undertake the expense and risk of cutting the foam themselves. Unless the cutter is experienced, any savings in initial purchase of bulk material is quickly lost in wastage alone. Others seek to avoid the problem of cutting special shapes by building the desired shape from sections of standard shapes to which are bonded special pre-cut sections. This is time-consuming, and results in a non-uniform finished product.

The object of this invention is to provide a relatively inexpensive, accurate device for cutting foam rubber and any other material having similar cutting characteristics.

Another object of this invention is to provide accessories which are adaptable to conventional saws to provide means for cutting foam rubber efficiently, accurately and inexpensively.

These and other objects are accomplished by a device comprising motor means having a reciprocatingly moving member, a blade connected for reciprocating movement to said reciprocatingly moving member, said blade having a longitudinal cutting edge section comprising a pattern of toothed sections and toothless sections each having an axis aligned with the central axis of said blade; and a guide member comprising a longitudinally extending slotted section and a transverse base section, said slotted section having opposing walls defining a longitudinal slot therebetween, said blade being partially located within said slot with said longitudinal cutting section of said blade extending from said slot, said base section having an opening in opposing relationship to said slot sufficient to allow said blade to pass therethrough during reciprocal movement of said blade.

Both the blade of this invention and the guide member may be fitted to a conventional reciprocating saw such as a saber or jig saw.

The preferred embodiment of the invention is illustrated in the drawings wherein:

FIG. 1 is a perspective view of the device of this invention;

FIG. 2 is a view taken along line 2—2 of FIG. 1;

FIG. 3 is a partial front view of the device of the invention;

FIG. 4 is a sectional view of the lower section of the device taken along line 4—4 of FIG. 2; and FIG. 5 is a front view showing details of a preferred blade of this invention.

Referring to FIG. 1, a conventional jig saw 10 (such as a Black and Decker Jig Saw No. 7504) is shown, to the underside of which is conventionally mounted a bracket 12. The leading edge of bracket 12 includes upturned tabs 14 between which is a notch 16. Attached by conventional means to mounting head 18 of saw 10 is a blade 20. Extending vertically downward from the underside of bracket 12 is a guide member 21 including a blade guard 22 and a cutting base 24. Blade guard 22 may be readily welded to the underside of the conventional bracket 12. Blade guard 22 has a U-shape, the side walls being spaced to define a forward, longitudinally extending slot 26 in which is located all of blade 20 except for the cutting section (see FIG. 4). The side walls 28 and 30 defining slot 26 flare outwardly from the opening of slot 26 for a short distance and then converge at the rear wall 32. Thus, blade guard 22 presents a wedge-shape to the material being cut. The angle of the wedge is preferably such that a tangent along the edge of the side walls will intersect the vertical line connecting the ends of each of the teeth 50. This has been found to be advantageous in that the line of cut is expanded allowing the relative movement of the saw and material to proceed smoothly and without undue pinching.

Blade guard 22 extends into the interior of cutting base 24. Cutting base 24 is preferably composed of a single sheet of metal or other suitable material, the sheet having a forward, smoothly curved bend 34 from which upper section 36 gradually, progressively inclines to a point designated by the numeral 38 and thereafter flattens out into a horizontal plane extending to the rear edge of upper section 36. A notch 40 is cut in this horizontal portion of upper section 36, the notch being directly across from the slot 26. The opening provided by notch 40 is sufficient to receive the blade guard 22 and to accommodate the portion of blade 20 which extends from slot 26. Blade guard 22 is preferably welded or otherwise attached to the cutting base 24 at notch 40. The lower section 44 of cutting base 24 is preferably horizontally disposed as illustrated to allow the lower surface to be moved smoothly across a tabletop or other horizontal surface on which the material to be cut is laid. A notch similar to notch 40 may be cut into lower section 44, and the blade guard 22 welded to the lower section 44 as well. The curvature of bend 34 and the incline of upper section 36 are desirable in order to permit the foam rubber to be fed into the blade smoothly.

Details of the preferred blade of this invention are provided by FIGS. 3 - 5, inclusive. Conventional jig or saber saw blades have teeth which are slightly laterally offset from the longitudinal center line of the blade. One tooth will be offset to the right, the next to the left. Such a set for the teeth is considered desirable for cutting materials because a cut is made which is thicker than the blade itself, thereby allowing the non-cutting region of the blade to pass along the cut line without binding. However, I have found that blades with set actually detract from the cutting of foam rubber and like material. Also, blades with set produce a large amount of foam material sawdust which is difficult to control, especially because of static electricity which is produced.

As is seen from FIG. 5 in particular, the axis of individual teeth 50 are aligned with the center, longitudinally extending line 52 of blade 20. The cutting section of blade 20 has a plurality of toothed sections 54. In the figures, each toothed section 54 has five teeth. Between each toothed section 54 is a toothless section 56. In the preferred embodiment, the toothless sections 56 are all the same as are the toothed sections 54. The former are preferably smoothly arcuate-shaped grooves or notches with the innermost point of the groove (the depth of the groove) being approximately on line with the base of the teeth 50 (the depth of the teeth). It is optional but preferred to grind the toothless sections 56 to a knife edge as shown in FIG. 5, with the edge being coincident with center line 52. The teeth are preferably downwardly directed. This causes the material to be cut to be pressed downwardly against the upper section 36 of cutting base 24, thereby controlling the material within the cutting region between bracket 12 and base 24.

A blade such as is depicted in the figures having a regular pattern of toothed and toothless sections has proved to be excellent for cutting foam rubber. The blade pattern shown is 1:1, i.e., one toothed section is followed by one toothless section, etc. The first and last sections of the blade are toothed sections. The length of a toothed section may be greater, less, or equal to the length of the toothless section. In the depicted embodiment, the toothed section is slightly longer. The toothless sections are each arcuate, preferably semicircular notches between adjacent teeth of adjacent toothed sections. The radius of the notches is perpendicular to the longitudinal axis of the blade 20.

A blade of this invention may be produced from a conventional hack saw blade, e.g., a blade 10 inches (25.4cm.) long, 0.5 inches (1.2 cm.) wide and 0.025 inches (0.063 cm.) thick with 18 teeth per inch (7 teeth per cm.). The set is removed by grinding, as are the teeth which are located where the toothless section is to be located. The knife edge can then be produced by grinding, if desired.

The blade cuts in reciprocating fashion. In FIG. 4, blade 20 is shown in solid line at the height of the upstroke and in dotted line at the bottom of the downstroke. At the height of the upstroke, the bottom blade 20 is slightly above the surface of upper section 36. At the depth of the downstroke, the bottom of blade 20 is between upper section 36 and lower section 44, being slightly elevated from the latter. Since the stroke rate far exceeds the cutting rate of the material, no problem is encountered by the fact that blade 20 is actually raised from the cutting base at the height of the upstroke.

It is to be understood that many modifications may be made in the invention without departing from the scope thereof. The pattern of toothed and toothless sections may be varied from the 1:1 pattern herein illustrated. The wedge-shapes of the blade guard and cutting base are desirable in that cutting speed and accuracy is maximized.

What is claimed is:

1. A device for cutting foam rubber-like material comprising
   a. motor means having a reciprocatingly moving member:
   b. blade means consisting of a single blade connected for reciprocating movement to said reciprocatingly moving member, said blade having a longitudinal cutting edge section comprising a pattern of toothed sections and toothless sections each having an axis aligned with the central axis of said blade; said toothed sections consisting of downwardly directed teeth and
   c. a guide member comprising a longitudinally extending slotted section and a transverse base section, said slotted section having opposing walls defining a longitudinal slot therebetween, said blade being partially located within said slot with said longitudinal cutting section of said blade extending from said slot, said base section having an opening in opposing relationship to said slot sufficient to allow said blade to pass therethrough during reciprocal movement of said blade, said base section comprising a bottom plate and a top plate joined at a forward point to said bottom plate, said top plate having a forward portion inclining from said forward point and a rearward portion extending from said forward portion, said rearward portion being located in a plane perpendicular to said slotted section whereby said rearward portion provides a platform for supporting said foam rubber-like material normal to said blade during the cutting operation.

2. The device of claim 1 wherein said toothless sections comprise arcuate-shaped notches in said blade.

3. The device of claim 1 wherein said pattern is a regular pattern.

4. The device of claim 1 wherein said pattern consists of alternatingly occurring toothed sections and toothless sections.

5. The device of claim 4 wherein the pattern commences and ends with toothed sections.

6. The device of claim 1 wherein said toothless sections are semi-circular notches having a knife edge aligned with the central longitudinal axis of said blade.

7. The device of claim 1 wherein said opposing walls of said slotted section diverge from the opening of said slot such that said slotted section has a wedge shape.

8. The device of claim 1 wherein the depth of said toothed sections is equal to the depth of said toothless sections.

9. The device of claim 1 wherein said slotted section of said guide member further comprises a rear wall, and said opposing walls of said slotted section diverge from said longitudinal slot towards said rear wall for a distance and then converge toward said rear wall.

10. The device of claim 1 wherein said toothed sections and said toothless sections are substantially the same length and depth.

11. A method for cutting foam rubber-like material comprising:
   1. providing reciprocating blade means, said blade means consisting of a single blade having a longitudinal cutting edge section comprising a pattern of toothed sections and toothless sections, said toothed and toothless sections being substantially equal in length and depth, said toothed sections consisting of downwardly directed teeth,
   2. providing a guide member operatively associated with said blade means, said guide member comprising a slotted section having opposing walls defining a slot therebetween, said blade means being partially located within said slot with said longitudinal cutting edge section extending from said slot, said opposing walls of said slotted section diverging from said slot such that said slotted section presents a wedge-shape to said material being cut, said guide member further comprising a base section having an opening in opposing relationship to said slot sufficient to allow said blade to pass therethrough during reciprocal movement of said blade, said base section comprising a bottom plate and a top plate joined at a forward point to said bottom plate, said top plate having a forward portion inclining from said forward point and a rearward portion extending from said forward portion, said rearward portion including said opening and being disposed at a right angle to the longitudinal axis of said blade to provide a platform for presenting said foam-rubber like material to said blade at a right angle to said blade, 3. locating said foam-rubber like material on said rearward portion of said guide section, and 4. feeding said foam-rubber like material into said blade whereby said material is compressed between said teeth and said rearward portion by said downwardly directed teeth as said material is cut by said teeth.

* * * * *